(No Model.)
A. T. VERNON.
WATER MOTOR.
No. 542,453. Patented July 9, 1895.
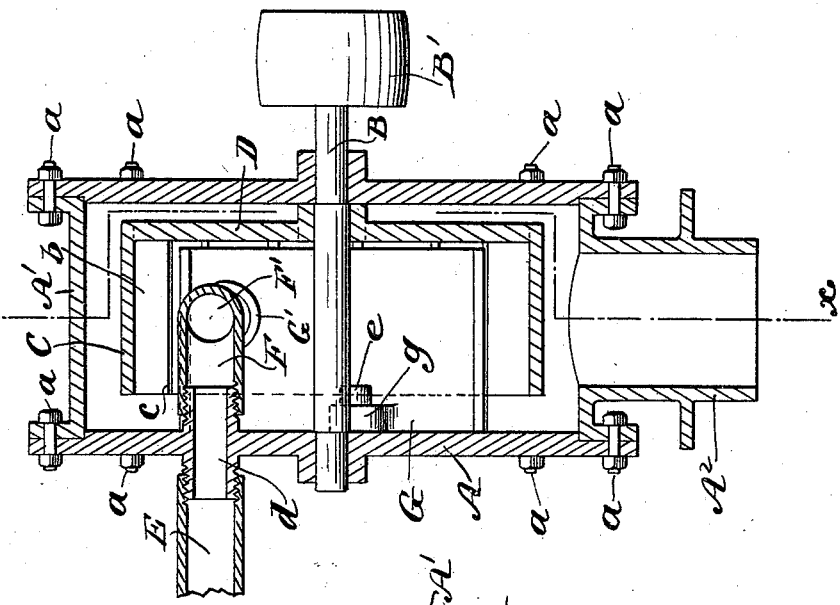
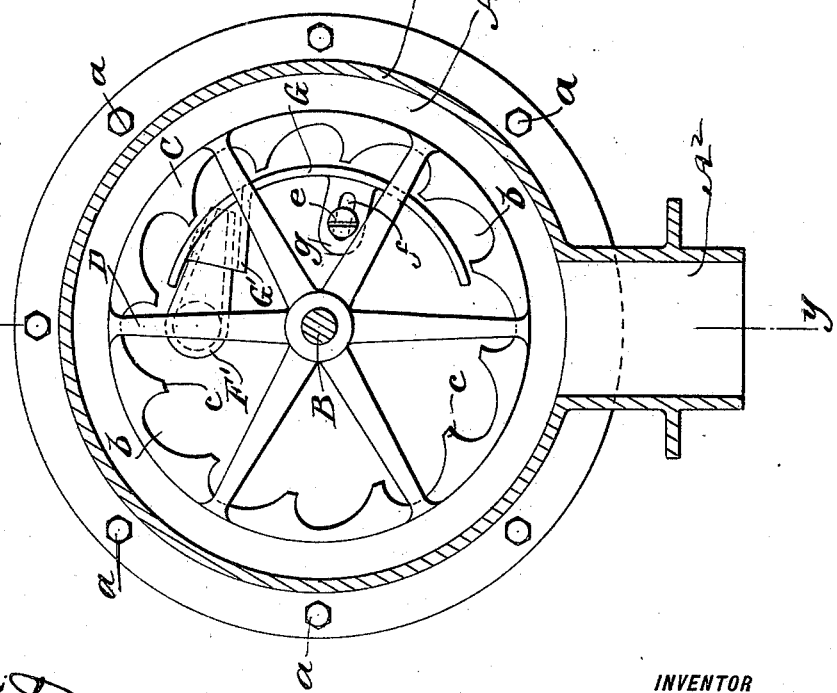
WITNESSES:
INVENTOR
Archer T. Vernon,
BY
Edgar Tate & Co
ATTORNEYS.

UNITED STATES PATENT OFFICE.

ARCHER THOMAS VERNON, OF GREENSBOROUGH, NORTH CAROLINA.

WATER-MOTOR.

SPECIFICATION forming part of Letters Patent No. 542,453, dated July 9, 1895.

Application filed September 15, 1894. Serial No. 523,076. (No model.)

*To all whom it may concern:*

Be it known that I, ARCHER THOMAS VERNON, a citizen of the United States, and a resident of Greensborough, county of Guilford, and State of North Carolina, have invented certain new and useful Improvements in Water-Motors, of which the following is a specification, reference being had to the accompanying drawings, forming a part thereof, in which similar letters of reference indicate corresponding parts in all the figures.

This invention relates to water-motors, and has for its object to provide a simple, cheap, readily-constructed, and perfectly-operating device of this character, wherein a greater efficiency may be had than with the ordinary water-motor, and this I attain by providing the inner periphery of the wheel with the buckets or water-resisting surfaces and directing the flow of the water to the interior of the wheel, and, furthermore, by providing means to prevent any loss of the full force and effect of the water.

The invention consists in the novel construction and arrangement of parts hereinafter fully described.

In the accompanying drawings, Figure 1 is a longitudinal section taken upon the line $xx$, Fig. 2. Fig. 2 is a vertical cross-section taken upon the line $yy$, Fig. 1.

In the practice of my invention I construct a casing A, in the form of two disks connected together by a flanged tubular section A', secured thereto by bolts $a$. Depending from the bottom of the section A' is an outlet-pipe $A^2$ of any desired construction.

Journaled in the casing A is a shaft B, having mounted thereon within the said casing a wheel C, of appreciable width and suitable size, and having at one side thereof spokes D, by which it is secured upon the shaft B, the opposite side of the wheel being open. Upon the interior of the wheel the same is cut out to form recesses $b$, intervened by projections $c$, both the said recesses and projections extending across the inner face of the wheel. These recesses, in conjunction with the projections formed thereby, serve as buckets, and are deepest at the bottom, to take a generally eccentric or tangental direction and to receive the full force of the water.

Extending through the casing A and preferably formed integrally therewith is an inlet tube $d$, screw-threaded at each end thereof to receive upon the outside the supply-pipe E, and upon the interior the elbow F, upon the top of which is mounted the tapered nozzle F', which is directed at an angle slightly below the horizontal plane. Between the nozzle F' and the projections $c$ is a segmental guard G, extending from a point adjacent to the spokes D to the opposite side of the casing A, to which it is secured by means of a screw $e$, passing through a slot $f$ in an extension or lug $g$, which is secured or formed upon the said guard, the said slot being elongated whereby the guard is adjustable relatively to the wheel. Immediately in front of the nozzle F' the guard G is open to receive the flow of water therethrough, and is provided with a rearward extension or guide G', which receives the nozzle therein and serves to direct the flow of the water at the desired angle.

The operation of the device will be readily understood from the foregoing description, taken in connection with the accompanying drawings. The water, being caused to flow into the pipe E, passes through the tube $d$ and the nozzle F', by which it is projected against the buckets in the interior periphery of the wheel formed by the recesses $b$ therein, which causes the wheel to revolve and correspondingly actuate the shaft B and the usual driving-wheel B', and as the direction of the nozzle F' is outward, the water, as it overflows the bucket and falls below, drops into the buckets beneath and thus helps to revolve the wheel, in place of being wholly lost, as is the case with wheels having exterior buckets. At the same time, the guard G prevents any loss of the water by being thrown inwardly through centripetal force, and also, in effect, serves to almost wholly close the buckets as they pass the said guard and receive the water, thereby adding to their retaining qualities, and, as before stated, this guard may be adjusted radially with respect to the wheel C, according to the force or direction of flow of the water or as conditions or circumstances may render desirable. The water eventually escapes through the outlet $A^2$.

The advantages resultant from the use of my invention, which I consider to be broadly novel, will be manifest to all who are conversant with the general class of devices to which this invention appertains.

Having thus fully described my invention, what I claim as new, and desire to secure by Letters Patent, is—

A water motor comprising a casing, a shaft journaled therein, a wheel within the casing, open at one side and having spokes at the opposite side by means of which it is mounted upon the shaft, the interior periphery of the said wheel being cut out to form buckets, an inlet tube extending through the casing to receive the supply pipe thereon, an elbow secured upon the said tube, a tapered nozzle mounted thereon, extending within the wheel and directed against the buckets, a segmental guard having a slotted lug thereon and adjustably secured to the casing by a screw passing therethrough, the said guard having an opening therein at the top, and an extension or guide at the rear of the said opening through which the nozzle extends, substantially as shown and described.

In testimony that I claim the foregoing as my invention I have signed my name, in presence of two witnesses, this 13th day of September, 1894.

ARCHER THOMAS VERNON.

Witnesses:
C. D. THORTON,
L. R. THACKER.